United States Patent
Ledbetter et al.

(10) Patent No.: US 8,725,601 B2
(45) Date of Patent: May 13, 2014

(54) METHOD AND APPARATUS FOR CONSUMER DRIVEN PROTECTION FOR PAYMENT CARD TRANSACTIONS

(75) Inventors: Richard Howard Ledbetter, Lithia, FL (US); Deborah Joy Ingram, Dover, FL (US); Suzanne Adrienne LaProva, Seminole, FL (US)

(73) Assignee: PSCU Financial Services, St. Petersburg, FL (US)

( * ) Notice: Subject to any disclaimer, the term of this patent is extended or adjusted under 35 U.S.C. 154(b) by 1447 days.

(21) Appl. No.: 12/353,733

(22) Filed: Jan. 14, 2009

(65) Prior Publication Data

US 2009/0164354 A1 Jun. 25, 2009

Related U.S. Application Data

(63) Continuation of application No. 12/275,975, filed on Nov. 21, 2008, now abandoned.

(51) Int. Cl.
*G06Q 40/00* (2012.01)

(52) U.S. Cl.
USPC .......................................................... 705/30

(58) Field of Classification Search
USPC .......................................................... 705/26
See application file for complete search history.

(56) References Cited

U.S. PATENT DOCUMENTS

| | | | |
|---|---|---|---|
| 5,655,007 A | 8/1997 | McAllister | |
| 5,903,721 A | 5/1999 | Sixtus | |
| 5,991,738 A | 11/1999 | Ogram | |
| 5,991,750 A | 11/1999 | Watson | |
| 6,012,144 A | 1/2000 | Pickett | |
| 6,098,053 A | 8/2000 | Slater | |
| 6,226,624 B1 | 5/2001 | Watson et al. | |
| 6,381,584 B1 | 4/2002 | Ogram | |
| 6,931,382 B2 | 8/2005 | Laage et al. | |
| 7,264,154 B2 | 9/2007 | Harris | |
| 7,346,577 B1 | 3/2008 | Williams et al. | |
| 7,389,275 B2 | 6/2008 | Kemper et al. | |
| 7,427,021 B2 | 9/2008 | Kemper et al. | |
| 2001/0029496 A1 | 10/2001 | Otto et al. | |
| 2001/0042051 A1 | 11/2001 | Barrett et al. | |

(Continued)

FOREIGN PATENT DOCUMENTS

| | | |
|---|---|---|
| EP | 0745961 A2 | 12/1996 |
| WO | 0046769 A1 | 8/2000 |
| WO | 03001866 A1 | 1/2003 |
| WO | 03083737 A1 | 10/2003 |

OTHER PUBLICATIONS

International Search Report for PCT/US2009/047663 published May 27, 2010 (2 pages).

*Primary Examiner* — Shay S Glass
(74) *Attorney, Agent, or Firm* — Katten Muchin Rosenman LLP (57) ABSTRACT

Method and apparatus for facilitating a commercial transaction between an account holder and a merchant. The account holder has an account that is associated with respective account information. The account information includes at least one criterion for pre-authorizing a transaction. When the consumer initiates a purchase transaction, a transaction approval request is generated which includes information relating to the commercial transaction. A purchase approval entity compares the received transaction approval request to the account information to determine whether the at least one criterion for pre-authorizing the transaction is satisfied. The transaction approval request is denied when a determination is made that the at least one criterion for pre-authorizing the transaction is not satisfied.

25 Claims, 4 Drawing Sheets

(56) References Cited

U.S. PATENT DOCUMENTS

| | | |
|---|---|---|
| 2002/0035539 A1 | 3/2002 | O'Connell |
| 2002/0035548 A1 | 3/2002 | Hogan et al. |
| 2002/0099642 A1 | 7/2002 | Schwanki et al. |
| 2002/0152179 A1 | 10/2002 | Racov |
| 2002/0174030 A1 | 11/2002 | Praisner et al. |
| 2003/0046235 A1 | 3/2003 | Lacivita et al. |
| 2003/0101137 A1 | 5/2003 | Wronski, Jr. |
| 2003/0115151 A1 | 6/2003 | Wheeler et al. |
| 2004/0107125 A1 | 6/2004 | Guheen et al. |
| 2007/0295801 A1* | 12/2007 | Harris ............ 235/375 |
| 2007/0299742 A1* | 12/2007 | Williams et al. ........ 705/26 |
| 2008/0228648 A1 | 9/2008 | Kemper et al. |
| 2008/0235136 A1 | 9/2008 | Kemper et al. |
| 2008/0265018 A1 | 10/2008 | Kemper et al. |
| 2009/0070265 A1 | 3/2009 | Hrabosky |

\* cited by examiner

METHOD AND APPARATUS FOR CONSUMER DRIVEN PROTECTION FOR PAYMENT CARD TRANSACTIONS

CROSS REFERENCE TO RELATED APPLICATION

This is a continuation of U.S. patent application Ser. No. 12/275,975 filed Nov. 21, 2008 (now abandoned). The entire contents and disclosure of the above-identified application are hereby incorporated by reference.

FIELD OF THE INVENTION

The present invention relates to methods and systems for providing secure electronic commercial transactions. In particular, the present invention relates to methods and systems for preventing commercial transactions that are not pre-authorized.

BACKGROUND OF THE INVENTION

Electronic commerce, buying and selling by electronic means, has become commonplace in modern society. With the continued expansion of the World Wide Web, electronic commerce has become feasible for any person or organization with a computer. For several reasons, more and more people are choosing to transact business, e.g., shopping or paying bills, from a computer. One reason consumers are attracted to Internet commerce is because Internet based businesses typically offer items at discounted prices. Another reason is that the Internet is accessible twenty-four hours a day, enabling the consumer to transact business, e.g., shop, at their convenience.

The payment means for many consumer electronic purchases is a credit card. The credit card represents a prearranged credit account held by an account holder and issued by a Financial Institution, the account owner. In one scenario, the account holder makes an electronic purchase with a merchant, using a credit card. The merchant submits the purchase request to a credit card company for purchase authorization. The credit card company then authorizes or denies the credit card transaction with the merchant. If the purchase is approved, the prearranged credit account is debited in the amount of the purchase. In such a scenario, the authorization conducted by the credit card company may involve a third party account security system, which verifies the purchase with the account holder.

Credit cards offer many advantages to account holders. For example, people having access to a credit card may spend less time at the bank, as well as, balancing checking and savings accounts. In addition, a credit card eliminates the need to carry large sums of cash. Further, purchase approval is automated when using a credit card while purchase approval with check or money order is delayed. Therefore, when making a purchase by phone or mail order, using a credit card eliminates the delay associated with sending payment through the mail.

As a result of increased electronic commerce, credit card security has become a major concern for account owners and account holders. Some account holders are leery of making credit card purchases over the Internet for fear of interception and unauthorized use of their credit card account. These fears are justified because the language in which most Internet web pages are written, HyperText Markup Language (HTML), uses vulnerable methods of transferring information.

To combat Internet security issues, some merchant networks utilize encryption techniques to secure transactions made over the Internet. This offers little comfort to the concerned consumer, because such encryption techniques may be deciphered by sophisticated criminals. Further, even if the transmission of the credit card number is secure, the card number is still stored on the receiving computer, and could be stolen by breaking into that computer. Additionally, credit card numbers can be stolen directly from the card by such devices as pocket scanners.

Some commercial accounts, e.g., checking accounts, offer debit cards that face the same, if not increased, security risks as credit cards. Debit cards are similar to credit cards, however, to complete a debit transaction, the account holder's Personal Identification Number (PIN) is frequently given in addition to the card number at the time of purchase. In addition, the debit card draws funds from the account (typically a checking account) to which it corresponds. In many cases, the PIN given with debit card transactions may be the same PIN used to access the account, e.g., via automated teller machine or phone, to which the debit card is linked. If a purchase transaction made using a debit card is intercepted and used fraudulently, the intercepting thief has the ability both to make purchases using the debit card number and, with the PIN, to draw funds directly from the associated debit account.

The need for improved credit card safety has put pressure on credit card companies and merchants to provide methods of ensuring secure electronic transactions. For example, U.S. Pat. No. 6,012,144 to Pickett discloses a method for performing secure transactions, such as credit card purchases, using two or more non-secure networks (such as the Internet and the public telephone system) in such a way that security is insured. A person wishing to initiate a secure transaction sends a message over one of the non-secure networks to a computer. That computer automatically uses the second non-secure network to contact the person back to verify the transaction. The call-back mechanism employs a method to authenticate the identity or authority of the person initiating the transaction. No single wire-tapping or network snooping device sees the entire transaction. No single database contains the entire set of information.

U.S. Pat. No. 5,903,721 to Sixtus discloses a method for executing a secure online transaction between a vendor computer and a user computer, wherein the vendor computer and the user computer are interconnected to a computer network such as the Internet for data communications therebetween. The method comprises the steps of the user computer transmitting a transaction request message to the vendor computer via the computer network, the financial transaction request comprising user identification data unique to the user computer; in response to receiving the transaction request, the vendor computer sending a transaction verification request to a trust server computer interconnected to the computer network, the transaction verification request comprising the user identification data and data indicative of the requested transaction; in response to receiving the transaction verification request, the trust server computer authenticating the user computer by using the user identification data and communicating with the user computer for verification with the user identification data; and the trust server authorizing the transaction when the authenticating step has passed.

As another example, U.S. Pat. No. 5,991,738 to Ogram discloses an automated payment system particularly suited for purchases over a distributed computer network such as the Internet. In such a distributed computer network, a merchant or vending computer contains certain promotional information which is communicated to a customer's computer. Based upon the promotional information, the operator of the customer's computer decides to purchase the services or goods described by the promotional information. The customer's computer is linked to a payment processing computer and the customer's credit card number and the amount of the goods or services is transmitted to the payment processing computer. The payment processing computer automatically contacts a bank for verification of the credit card and amount; the bank transmits an authorization to the payment processing computer. The payment processing computer communicates a self-generated transaction indicia, and in some embodiments a password, to the customer's computer. In the embodiment where a password is used, the customer's computer uses the password with the merchant's computer in obtaining access to protected information or to establish shipping instructions.

An additional security method is described in U.S. Pat. No. 7,264,154 to Harris (hereinafter "Harris"), which discloses a system and method for verifying a commercial transaction between a card-holder, a merchant, and a credit card company. The card-holder makes a purchase with the merchant using a full credit card number. The merchant submits a transaction approval request (TAR) for approval with the credit card company. The credit card company executes conventional credit approval of the transaction approval request, as well as verifies the transaction approval request with the card-holder. An approval is sent to the merchant only after the transaction approval request is both conventionally approved by the credit card company and verified by the card-holder. The card-holder, or the credit card company, may initiate verification of the transaction approval request. The transaction approval request can also be automatically verified if one or many pre-verification criteria is/are satisfied by data contained in the transaction approval request. The pre-verification criteria can be initially determined and/or modified by the card-holder. As another security feature, the card-holder may selectively activate and deactivate their credit card/account as desired. The credit card itself includes indicia of security measures.

The system and method of Harris, however, requires that the transaction approval request be verified by the card-holder, i.e., approval is sent to the merchant only after the transaction approval request is verified by the card-holder. This places the card-holder in the transaction approval process for each transaction and increases transaction processing time.

In addition, Harris discloses automatic verification of a transaction approval request if pre-verification criteria are met. For example, at column 4, line 62-column 5, line 31, Harris discloses a system and method for pre-verifying certain transactions. According to Harris, the authorization module compares the transaction approval request with the pre-verification criteria and automatically verifies the transaction approval request if the pre-verification criteria are met. Harris also discloses, at column 9, line 65-column 10, line 4, that Verification Pending Queue (VPQ) 228 provides storage for pending TARs awaiting verification by card-holder 102 and that TARs remain in VPQ 228 until verified, denied, or until the lapse of a predetermined time period. Further, FIG. 14 of Harris illustrates that if in fifth step 809, the pre-verification requirements are not satisfied, then in a sixth step 810, authorization module 226A transfers the associated TAR record to VPQ 228 (which provides storage until card holder disposition, as discussed above). Accordingly, the system and method of Harris pre-verify TARs, then provide two options: 1.) the TAR is either approved when the pre-verification criteria are satisfied; or 2.) the TAR is directed to the VPQ for further verification by the card holder when the pre-verification criteria are not satisfied. As such, the final disposition of a non-pre-verified TAR is delayed, while the TAR is stored in the VPQ, until the card holder has the opportunity to verify the TAR. Further, by storing non-pre-verified TARs, the potential for a breach in the security of the stored TARs is significantly increased.

SUMMARY OF THE INVENTION

In one aspect, the present invention relates to a method for facilitating a commercial transaction between an account holder, who has an account, and a merchant. The account is associated with account information, which may include at least one criterion for pre-authorizing a transaction. The method comprises the steps of receiving a transaction approval request (TAR), which includes information relating to the commercial transaction, and comparing the received information to the account information to determine whether the criteria for pre-authorizing the transaction are satisfied. The method further comprises the step of denying the TAR when a determination is made that the pre-authorization criteria are not satisfied. By denying the TAR in such a manner the disposition time of the non-pre-authorized TARs is significantly minimized and additional communications with the account owner and additional transmission of sensitive account information are avoided.

In another aspect the present invention provides for a method of using an account to conduct a transaction between a merchant and an account holder. The account is associated with account information, which may include at least one criterion for pre-authorizing a transaction. The method comprises the steps of submitting a TAR, which includes information relating to the transaction, and obtaining a result of a comparison of the submitted information to the account information. The result of the comparison includes a determination of whether the pre-authorization criteria are satisfied. The method further comprises the step of refusing the transaction associated with the non-satisfied pre-authorization criteria when a determination is made that the pre-authorization criteria are not satisfied.

The present invention, in another aspect, relates to a system for facilitating a commercial transaction between a merchant and an account holder. The account is associated with account information, which may include at least one criterion for pre-authorizing a transaction. The system comprises a server configured to receive the account information and a TAR, which may include information relating to the commercial transaction. The server may also be further configured to compare the received information to the account information to determine whether the pre-authorization criteria are satisfied. The server is further configured to deny the TAR when a determination is made that the pre-authorization criteria are not satisfied.

In addition, the present invention provides for a system that further comprises a merchant terminal and an account terminal. The merchant terminal is connected to a network and is configured to transmit the TAR. The merchant terminal is further configured to receive an approval or a denial of the TAR. The account terminal is connected to the network and is configured to transmit the account information. In this aspect of the invention, the server may be in communication with the account terminal and the merchant terminal via the network. The server may be configured to receive the information relating to the first commercial transaction and may be further configured to compare the received information to the account information to determine whether the pre-authorization criteria are satisfied. In this aspect, the server is further configured to deny the TAR when a determination is made that the pre-authorization criteria are not satisfied.

BRIEF DESCRIPTION OF THE DRAWINGS

The present invention will be better understood in view of the non-limiting figures, wherein like characters refer to the same or similar parts throughout the views, and in which.

DETAILED DESCRIPTION OF THE PREFERRED EMBODIMENTS

The present invention relates to the provision of more secure electronic transactions, in particular, to the prevention of transactions that are not pre-authorized, e.g., by the account holder. In the course of everyday commerce, buyers and sellers conduct transactions among themselves. In doing so, transaction approval requests (TARs) are generated, e.g., by merchants or by other institutions. These TARs are requests, usually from merchants, for verification that the transaction being attempted is authorized by the prospective purchaser. Typically, these TARs are subjected to a transaction verification process, which may be performed by a financial institution or by a third party account security system. Generally, the TAR is verified by the account owner and results of an approval or a denial of the TAR are then provided to the merchant. In such a scenario, every TAR, is relayed or communicated to the account owner, at which point, the account owner is given the opportunity to approve or deny the TAR. The decision to approve or deny the TAR is made after the TAR is made. As such, even TARs that would not have met pre-authorization criteria, e.g., pre-determined pre-authorization criteria, are communicated to the account owner for disposition. Processes such as these involve communication and verification steps for each and every TAR, as well as additional input from the account owner, both of which provide opportunities for the security of the account to be breached. In contrast, the present invention protects the account owner and the account holder by first providing defined pre-authorization criteria and then denying all TARs that do not meet the defined pre-authorization criteria. In doing so, the need for further communications to the account owner relating to non-pre-authorized TARs and the transmission of sensitive account information are minimized, as are opportunities for security breaches, e.g., credit card fraud. Further, because the non-pre-authorized TAR is denied and no purchase occurs, the need for the account owner and/or the account holder to subsequently initiate dispute procedures is substantially eliminated.

Figure 1:
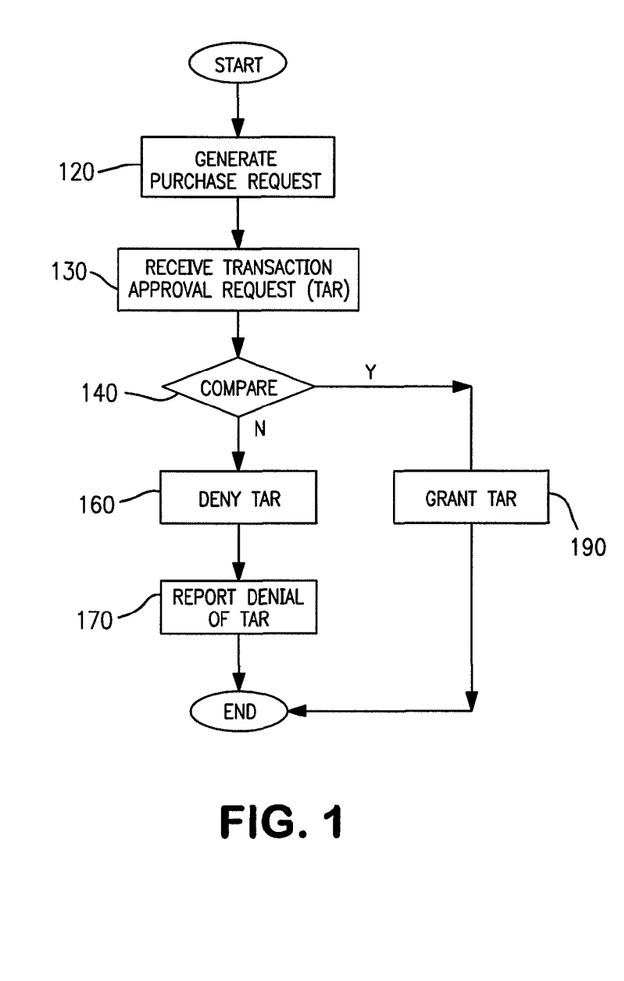
FIG. 1 is a flow diagram showing a method of facilitating a transaction between a merchant and an account holder in accordance with an embodiment of the present invention.

FIG. 1 represents a financial transaction process according to preferred embodiments of the present invention. One embodiment relates to a method of facilitating a transaction, e.g., a commercial transaction or a first commercial transaction, between an account holder and a merchant. In preferred embodiments, the account holder is the holder of an account, and the account is utilized to provide funding for the transaction. Exemplary transactions include, but are not limited to, credit purchases, debit purchases, returns, bill payments and online purchases. This list of transactions is not exhaustive. In a preferred embodiment, the account is a credit account or a debit account and the account is associated with a credit card or a debit card, respectively. Typically, the credit card or debit card is provided by the financial institution, e.g., a credit card company or a debit card company, and is utilized to facilitate transactions involving the account. Other types of accounts that may be utilized in various embodiments of the invention include gift cards, or any cards or plastics issued by a Financial Institution. Generally, the merchant offers goods or services that can be purchased, e.g., purchased via the Internet, by the account holder using the credit card or the debit card.

In many of the embodiments described herein, a credit card or debit card is utilized as a means to facilitate electronic commerce. Those skilled in the art will realize that the present invention is not, however, limited to purchases made using credit cards or debit cards. The present invention may be used in conjunction with any type of account to facilitate safe and secure electronic transactions that include transmission of an account number, such as Internet or other electronic transactions.

In one embodiment, the account is associated with account information. The account information may be any information relative to the account. Account information may include, for example, the name associated with the account, a number identifying the account, the balance of the account, a bank routing number, an identification code or other criteria that help uniquely identify the account. In a preferred embodiment, the account information is provided, e.g., provided to the third party account security institution or provided to the credit card company, by the account holder. In alternative embodiments, the account information may be provided by sources other than the account holder, e.g., the institution providing the account or the credit card company. In another embodiment, the account information is a compilation of information provided by the account holder and/or other sources.

In a preferred embodiment, the account information is modifiable by the account holder. That is to say, the account holder may be able to change and/or update the account information. In a preferred embodiment, the account holder has the ability to update the account information at any time. Preferably, the account holder has the ability to change and/or update the account information in order to prevent non-pre-authorized transactions from occurring. In another embodiment, the account holder may update the account information at specified times, e.g., prior to making a transaction request.

In a preferred embodiment, the account information includes at least one criterion for pre-authorizing a transaction. Such pre-authorization criteria may include, but are not limited to, a listing of authorized merchants, an authorized transaction amount range, an authorized maximum transaction amount, an authorized lock indicator, and/or an authorized date and/or time information, or any combination or permutation of the above. For example, a sale of a given dollar amount from a given merchant within a given time frame may be pre-authorized. In a preferred embodiment, the pre-authorization criteria are provided, determined and/or modified by the account holder. As an example, the account holder may provide pre-authorization criteria to the third party account security institution via an Interactive Voice Response (IVR) method, via a customer service representative, or via electronic means such as the Internet, Personal Digital Assistant (PDA), cell phone, etc. In an embodiment in which the IVR is utilized, the IVR may utilize the Automatic Number Identification (ANI) of the telephone of the account holder as one of the forms of customer verification. In one embodiment, the IVR method forces the account holder to provide a security answer, e.g., the last four digits of the account holder's social security number, to prove identity. In another embodiment, the provision or modification of the pre-authorization does not allow outside access to sensitive information, e.g., account numbers or account balances; only access to the pre-authorization criteria is permitted. In other embodiments, the account information is provided via mobile applications, home banking applications, other Web-based applications and/or Web-service applications. The features associated with the account information, e.g., those relating to the provision and modification thereof, see above, are also applicable to the pre-authorization criteria.

In preferred embodiments, the pre-authorization criteria are provided by the account holder and are not set, e.g., not pre-set, by the third party security institution or by the credit card company. Such an embodiment is distinguished from methods and/or systems in which the pre-authorization criteria are pre-set by a credit card company in that it is the account holder who establishes the pre-authorization criteria, not the credit card company. As such, the account holder is provided with increased control over the account. Further, pre-authorization criteria are not pre-set without the knowledge or input of the account holder.

The term "pre-authorization," as used in this document, refers to the satisfaction of acceptance criteria of a particular transaction before the proposed transaction is communicated to the account owner, or an additional third party, for approval or denial. In a preferred embodiment, the pre-authorization is based upon the pre-authorization criteria discussed above. For the purposes of clarity, "verification" means that the purchase request is communicated to the account owner, or equivalent, for approval or denial. "Verification" may not necessarily mean an approval of the purchase request.

As shown in FIG. 1, in one embodiment of the present invention, the method comprises step 120 of generating a purchase request. The purchase request may be related to the purchase of goods or services, the payment of debts, or the movement of capital. In one embodiment, the purchase is initiated by the account holder, e.g., the card holder, by making, or attempting to make, a purchase, e.g., an electronic purchase, from a merchant. This purchase may be made, for example, over the Internet, over the telephone through the mail or in person.

In a preferred embodiment, the method comprises step 130 of receiving a TAR. Preferably, the merchant submits a TAR to a third party, e.g., a third party account security institution, a bank or other financial institution, and/or a card processing company, in response to the purchase request of the account holder. Typically, the third party receives the TAR from the merchant. In one embodiment, the third party security institution, bank or other financial institution, and/or the card processing company performs the authorization. In one embodiment, the card processing company transmits the TAR to the third party security institution for authorization. Upon receipt of the TAR, the TAR undergoes an authorization process before an approval or denial of the TAR is issued.

The authorization process, generally, includes verification of the purchase, which will be discussed below. In one embodiment, the authorization includes a credit approval, which may be conducted by the card processing company as is known in the art. Typically, in the authorization process, the purchase requests, e.g., purchase requests that are pre-approvable, are communicated to and/or verified by the account owner. In a preferred embodiment, the third party account security institution verifies the pre-authorizable transaction request with the account owner, and transmits results of verification, indicating whether the transaction request has been approved, denied, disclaimed, etc., back to the card processing company. The verification may be achieved via Internet, via telephone lines and/or via any other means of electronic communication.

In preferred embodiments, the TAR includes information relating to the commercial transaction. As an example, the TAR may include the name of the merchant, an identifier relating to the merchant, the amount involved in the transaction, a product description, the date and time of the transaction or any other information helpful to identify the transaction to the account owner for verification. In a preferred embodiment, this information is utilized, e.g., by the third party security institution, to determine the disposition of the TAR, e.g., pre-authorization approval or further verification.

Accordingly, in a preferred embodiment, the method comprises step 140 of comparing the received information relating to the commercial transaction to the account information to determine whether the at least one criterion for pre-authorizing the transaction is satisfied. In other words, the transaction information is analyzed in light of the account information to determine the disposition of the TAR, e.g., how the TAR will be handled. In a preferred embodiment, the comparing step is performed by the third party security institution. In another embodiment, the comparing step is performed by the card processing company.

In one embodiment, the relevant transaction information is compared to pre-authorization criteria, which have been previously provided, e.g., by the account holder. In a preferred embodiment, the transaction information and the pre-authorization criteria are compared and/or analyzed prior to verification with the account owner. In another embodiment the transaction information and the pre-authorization criteria are compared and/or analyzed concurrently with the verification of the account owner.

In one embodiment, the account information comprises a listing of preferred merchants and the transaction information comprises a merchant identifier, e.g., a merchant name or merchant identification (ID) number. In this embodiment, the criterion for pre-authorization is that the merchant involved in the transaction is one of the merchants listed as a preferred merchant. Accordingly, the merchant identifier would be compared to the listing of preferred merchants. If the merchant is on the list, the TAR is pre-authorized. If the merchant is not on the list, the TAR is denied. In a preferred embodiment, a denied TAR is rejected and is not subject to further verification.

In one embodiment, the account information comprises a transaction amount range and the transaction information comprises a transaction amount. In this embodiment, the criterion for pre-authorization is that the transaction amount is within the transaction amount range. Accordingly, the transaction amount would be compared to the transaction amount range. If the transaction amount is within the transaction amount range, the TAR is pre-authorized. If the transaction amount is outside of the transaction amount range, the TAR is denied. In one embodiment, the comparison can be made such that a transaction amount that falls on one of the endpoints of the transaction amount range is pre-authorized or denied, depending on additional account information. In a preferred embodiment, a denied TAR is rejected and is not subject to further verification.

In one embodiment, the account information comprises a transaction amount maximum and the transaction information comprises a transaction amount. In this embodiment, the criterion for pre-authorization is that the transaction amount is equal to or below the transaction amount maximum. Accordingly, the transaction amount would be compared to the transaction amount maximum. If the transaction amount is equal to or below the transaction amount maximum, the TAR is pre-authorized. If the transaction amount is above of the transaction amount maximum, the TAR is denied. In one embodiment, the transaction amount maximum is a number that is pre-determined, e.g., pre-determined by the account holder. In a preferred embodiment, a denied TAR is rejected and is not subject to further verification.

In one embodiment, the account information comprises time and date information, e.g., ranges of times and dates, and the transaction information comprises transaction time and date information. In this embodiment, the criterion for pre-authorization is that the transaction time and date correspond to the time and date ranges provided in the account information. Accordingly, the transaction time and date information would be compared to the account time and date ranges. If the transaction time and date fall within the time and date ranges of the account information, the TAR is pre-authorized. If the transaction time and date fall outside of the time and date ranges of the account information, the TAR is denied. In a preferred embodiment, a denied TAR is rejected and is not subject to further verification.

Of course, other transaction data may be compared to other account data. The examples listed above do not constitute a complete listing.

In one embodiment, there are more than one criteria that are relied upon when performing the comparison. In a preferred embodiment, each of these criteria must be satisfied in order for pre-authorization of the TAR to occur. In another embodiment, only a pre-determined number of the criteria must be satisfied in order for a TAR to be pre-authorized. In another embodiment, if any one of the criteria for pre-authorization are not satisfied, pre-authorization of the TAR does not occur. In another preferred embodiment, there is only one criterion that must be satisfied in order for pre-authorization of the TAR to occur. In another embodiment, some of the criteria are satisfied and some are not satisfied. In such an embodiment, if more than a pre-determined number of criteria are satisfied, the TAR is pre-authorized, otherwise, the TAR is denied.

In a preferred embodiment, the method comprises step 160 of denying the transaction approval request when a determination is made that the criterion or criteria for pre-authorizing the transaction are not satisfied. In a preferred embodiment, TARs that contain transaction information that does not satisfy the pre-authorization criteria are denied without being subject to further verification, e.g., without being communicated to or otherwise presented to the account owner. In other words, in accordance with a preferred embodiment, the account owner is not required to verify any TAR that has not met the pre-authorization criteria; the TAR is denied before proceeding to the account owner. Such an embodiment is clearly distinguished from methods that require account owner verification, subsequent to the receipt of the TAR, for each and every TAR that is received; in such methods, failure to satisfy the pre-authorization criteria does not result in automatic denial of the TAR. In the embodiments of the methods and systems of the present invention, on the other hand, non-pre-authorized TARs are denied, without the possibility of further verification. By providing for denial, e.g., automatic denial, of all TARs that do not satisfy the pre-authorization criteria, the disposition time of the non-pre-authorized TARs is significantly minimized. Also, additional communications with the account owner and additional transmission of sensitive account information are avoided. Further, because the TAR is denied and no purchase occurs, there is no need for the account owner and/or the account holder to subsequently initiate dispute procedures. Hence, a safer, more secure transaction is achieved, fraudulent transactions are prevented and consumer confidence is increased.

As shown in FIG. 1, when the pre-authorization criteria are satisfied by the transaction information, the method may include step 190 of granting the TAR, e.g., pre-authorizing the transaction. In one embodiment, upon pre-authorization of the TAR, the transaction proceeds, e.g., the account owner receives the pre-authorized TAR for verification and upon approval by the account owner, the purchase is made.

In a preferred embodiment, the method further comprises the step of preventing further determinations regarding a non-pre-authorized TAR from being made. In other words, in this embodiment, the non-pre-authorized TARs are actively prevented from further verification, e.g., further verification by the account owner is not permitted, either permanently, of for a predetermined period of time, for example, 20 minutes, 30 minutes, 1 hour, 24 hours, 1 week, 1 month, etc.

In one embodiment, the method further comprises step 170 of reporting the denial of the TAR. By reporting the denial of the TAR, concerned parties, e.g., the account holder and/or the credit card company, are made aware of the non-pre-authorized TAR. Accordingly, the appropriate steps may then be taken to secure the account. In one embodiment, the reporting or notification of an attempted unauthorized transaction is communicated to the account holder immediately, or substantially immediately. As such, the account holder is immediately, or substantially immediately, alerted that possible fraudulent activity may have occurred. As an example, the denied TAR may be reported to the telephone, computer, PDA, or cell phone of the account holder. In one embodiment, the immediate alert allows the account holder to quickly report the event to a monitoring institution, e.g., fraud management. Other exemplary monitoring institutions include IDT.

In a preferred embodiment, reporting step 170 comprises notifying the account owner and/or all parties to the financial transaction when the TAR is denied.

In preferred embodiments, methods and systems of the invention apply to transaction and related TARs of any amount, inclusive of quick-service restaurants (QSR) and other transactions that do not require a signature. In other embodiments, the amount of the transaction or a transaction amount range may be specified and the authorization process may only apply to transactions in the specified range, e.g., transactions that are above international floor limits. Generally speaking, QSR transactions are those transactions under the amount of twenty U.S. dollars. Typically, these transactions, when initiated with a credit or debit card, require no signature. The twenty dollar amount is merely exemplary, of course, and any amount may be specified to determine the range for QSR transactions.

In one embodiment, the account information comprises a locked status indicator. The locked status indicator indicates whether the account is available for particular transactions, e.g., whether the account is locked or unlocked for particular transactions. In one embodiment, the transaction information comprises information relating to the fact that a transaction request is being made. In this embodiment, the criterion for pre-authorization is whether the locked status indicator is in the locked mode. In this embodiment, the transaction request is compared to the locked status indicator. If the locked status indicator is in the unlocked mode, the TAR is pre-authorized. If the locked status indicator is in the locked mode, the TAR is denied. In a preferred embodiment, a denied TAR is rejected and is not subject to further verification. In another preferred embodiment, the mode of the locked status indicator is specific to a particular item of transaction information, e.g., specific to a particular merchant. In this preferred embodiment, the locked status indicator may be in the locked mode for one merchant, yet still be in unlocked mode for other merchants. As such, the account is not locked for all subsequent transactions. Rather, the account remains available for use by other merchants. Such an embodiment is differentiated from other methods that entirely de-activate a card from use, once a particular criteria has been satisfied, then re-activate the same card by modifying activation data. By utilizing the methods (and systems) of the present invention, an account may be locked in relation to one merchant, while still being available to others, which results in an additional degree of safety and convenience.

In one alternative embodiment, the mode of the locked status indicator is not related to a particular merchant. In such an embodiment, if the locked status indicator is in the locked mode, the account may be locked with respect to this and all subsequent TARs; accordingly, all TARs received when the account is locked will be denied. In a preferred embodiment, the mode of the locked status indicator can be modified, e.g., changed from locked mode to unlocked mode or vice versa. In another embodiment, the mode of the locked status indicator can be modified multiple times, e.g., changed from locked mode to unlocked mode and back to locked mode. As an example, the account holder may set the locked status indicator to "locked mode" for a particular time period. As such, all TARs that are received during the time period would be denied. As a further example, the account holder may then modify, e.g., update, the locked status indicator to "unlocked mode," at which point, all TARs received after the modification would not be denied. Instead, these TARs may be further verified.

Figure 2:
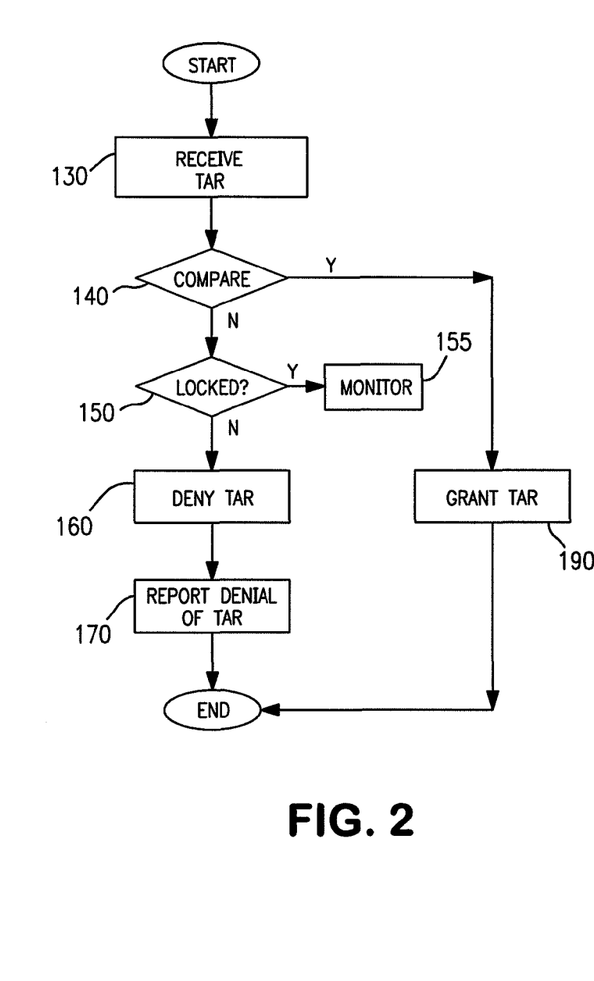
FIG. 2 is a flow diagram showing a method of facilitating a transaction between a merchant and an account holder, which utilizes a monitoring step in accordance with another embodiment of the present invention.

As shown in FIG. 2, in a preferred embodiment, wherein one of the criteria for pre-authorization is whether the locked status indicator is in the locked mode, the method includes step 150 of determining whether the account is locked with relation to the particular transaction information. In a preferred embodiment, a determination is made as to whether the TAR was denied due to non-satisfaction of the locked mode criteria. In addition, if the TAR was denied for non-satisfaction of the locked mode criteria, a preferred embodiment of the method further comprises step 155 of monitoring the account that is locked in relation to a particular transaction information.

Figure 3:
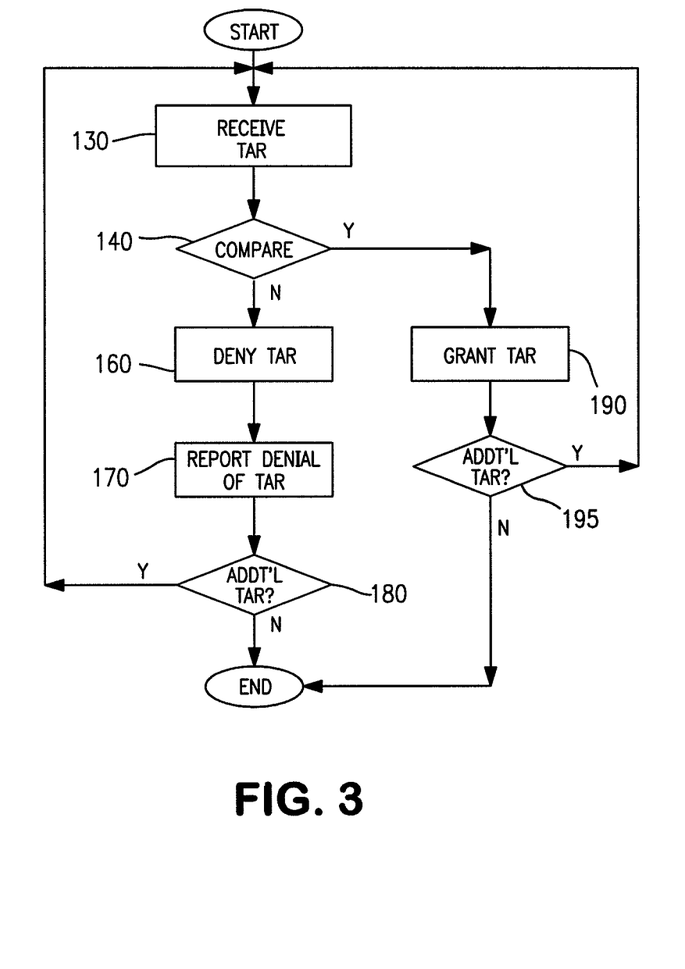
FIG. 3 is a flow diagram showing a method of facilitating a transaction between a merchant and an account holder, wherein multiple transaction approval requests are made, in accordance with yet another embodiment of the present invention.

As shown in FIG. 3, in preferred embodiments of the invention, multiple TARs may be processed. Accordingly, in a preferred embodiment, the method comprises step 180 of determining, after denial of the prior TAR, whether there is at least one additional TAR. In another preferred embodiment, the method comprises step 195 of determining, after grant of the prior TAR, whether there is at least one additional TAR. The additional transactions may be, for example, additional purchases from the same merchant or purchases from a different merchant altogether. By providing the ability to process multiple TARs, the embodiments of the present invention are capable of providing security for multiple transactions over extended periods of time. In one embodiment, at least one additional TAR includes information relating to a second commercial transaction. The second transaction information has the same features as the first or original transaction information, which is discussed above.

In preferred embodiments wherein multiple TARs are processed, the account information is updatable, e.g., capable of being updated by the account holder. The account information is capable of being modified, e.g., updated before the first (original) TAR, after the first TAR, or at both instances. Preferably, the account information is capable of being updated at any time during the execution of the embodiments of the method. In another preferred embodiment, the account information is updated after the original transaction request and prior to the at least one additional transaction approval request. Preferably, the account information is updated to include at least one criterion for pre-authorizing a second transaction. On one embodiment, the pre-authorization criterion/criteria for the second transaction are different from those of the first transaction. In one alternative embodiment, the pre-authorization criterion/criteria for the second transaction are the same as those of the first transaction, e.g., they are not modified.

In a preferred embodiment, the method further comprises the step of comparing the received information relating to the second commercial transaction to the updated account information. At this step, a determination is made as to whether the criteria for pre-authorizing the second transaction are satisfied. This comparing step is similar to the comparing step discussed above, except for the fact that the second transaction information and the updated account information may be different.

In a preferred embodiment, the comparing step is followed by the step of denying the transaction approval request when a determination is made that the criterion or criteria for pre-authorizing the transaction are not satisfied. Again, this step is similar to the denying step discussed above, and the same features apply.

In preferred embodiments, the methods and systems of the present invention are designed and/or configured so as to not interfere with pre-scheduled and recurring pre-scheduled transactions. In some embodiments the methods and systems of the invention do not inhibit pre-scheduled transactions and recurring pre-scheduled transactions from occurring as scheduled. In such a case, only non-pre-authorized transactions are targeted, while the ongoing functionality of the account, e.g., the pre-scheduled transactions and recurring pre-scheduled transactions, are permitted to continue as normal.

Another preferred embodiment relates to a method of using an account to conduct a commercial transaction between a merchant and an account holder. In one embodiment of such a method, the merchant is conducting the transaction, e.g., the merchant is performing the method. In a preferred embodiment, the merchant is performing the method to verify a potential purchase being made by the account holder. Of course, in such an embodiment, the account holder may utilize the account to pay for the purchase. In one embodiment, the account is associated with account information. In preferred embodiments, the features of the account, the account information and pre-authorization criteria may be similar to those features previously discussed in relation to other embodiments.

In a preferred embodiment, the method comprises the step of submitting a TAR. In some embodiments, the features of the TAR(s) may be similar to those previously discussed in relation to other embodiments of the present invention. Preferably, the merchant submits the TAR, e.g., submits the TAR to a third party, e.g., a third party security institution or a card processing company, in response to a purchase request of the account holder, accordingly, the third party receives the TAR from the merchant.

In a preferred embodiment, the method comprises the step of obtaining a comparison of the submitted information relating to the commercial transaction to the account information. In a preferred embodiment, the merchant performs the obtaining step. In one embodiment, the transaction information is analyzed in light of the account information to determine the disposition of the TAR, e.g., how the TAR will be handled. Preferably, the comparison is an authorization process, which compares the information included in the TAR to the pre-authorization criteria. In one embodiment, the third party security institution or the card processing company performs the authorization, then, provides results of the authorization to the merchant. In another embodiment, the comparison, e.g., the authorization, is performed by the merchant.

In a preferred embodiment, the comparison includes a determination of whether the criteria for pre-authorizing the transaction are satisfied. In one embodiment, the comparison is made by comparing the relevant transaction information to the pre-authorization criteria, which have been previously provided. In a preferred embodiment, the transaction information and the pre-authorization criteria are compared and/or analyzed prior to verification with the account owner. In another embodiment the transaction information and the pre-authorization criteria are compared and/or analyzed concurrently with the verification of the account owner. In preferred embodiments, the features of the comparison and/or the determination may be similar to the features discussed above in relation to the comparing step utilized in other embodiments.

In a preferred embodiment, the method comprises the step of refusing the transaction, e.g., the transaction associated with non-satisfied pre-authorization criteria, when a determination is made that the criterion or criteria for pre-authorizing the transaction are not satisfied. In one embodiment, the merchant performs the refusing step, e.g., refuses the transaction, or denies the TAR, when the pre-authorization criteria are not satisfied. In preferred embodiments, the features of the refusing step may be similar to the features discussed above in relation to the denying step utilized in other embodiments. In a preferred embodiment, TARs that contain transaction information that do not satisfy the pre-authorization criteria are denied and the respective transactions are refused without being subject to further verification, e.g., without being communicated to or otherwise presented to the account owner. In other words, in accordance with a preferred embodiment, the refusal of the transaction and/or the denial of the TAR are not subject to further verification by the account owner. Such an embodiment is clearly distinguished from methods that require account owner verification, subsequent to the submission of the TAR, for each and every TAR that is submitted. In the embodiments of the method and system of the present invention, non-pre-authorized TARs are denied and the respective transactions are refused, without the possibility of further verification. In doing so, additional communications with the account owner and additional transmission of sensitive account information are avoided.

Figure 4:
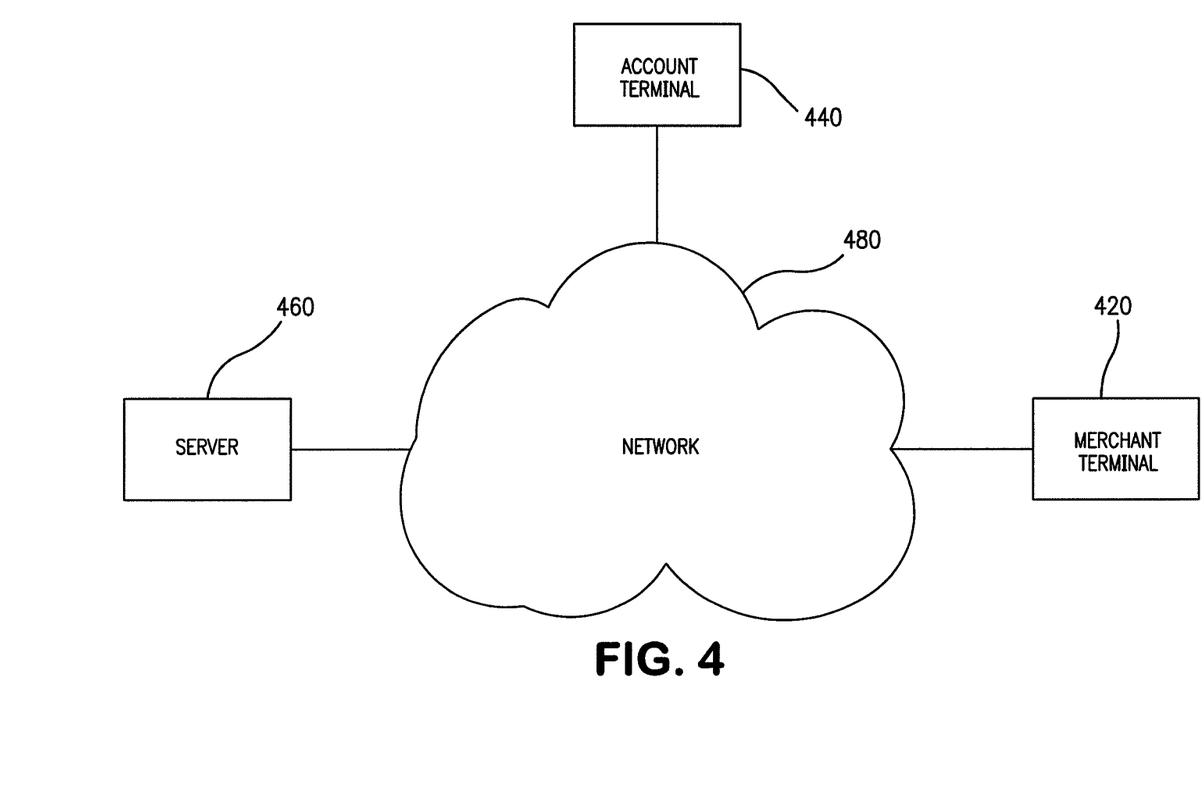
FIG. 4 is a block diagram showing a system in accordance with an embodiment of the present invention.

As shown in FIG. 4, system 400 is exemplary of a system for facilitating a first commercial transaction between a merchant and an account owner in accordance with preferred embodiments of the invention. Such a system is capable of implementing, at least, the embodiments of the methods discussed herein. In preferred embodiments, system 400 comprises merchant terminal 420, account terminal 440 and server 460. In one embodiment multiple merchant terminals 420 and/or account terminals 440 are included in the system. Server 460 is preferably implemented by the use of one or more general purpose computers, such as, for example, a Sun Microsystems F15k. Each merchant terminal 420 and/or account terminal 440 is also preferably implemented by the use of one or more general purpose computers, such as, for example, a typical personal computer manufactured by Dell, Gateway, or Hewlett-Packard. Each of server 460, account terminal 440 and merchant terminal 420 may include a microprocessor. The microprocessor may be any type of processor, such as, for example, any type of general purpose microprocessor or microcontroller, a digital signal processing (DSP) processor, an application-specific integrated circuit (ASIC), a programmable read-only memory (PROM), or the like. Server 460 may use its microprocessor to read a computer-readable medium containing software that includes instructions for carrying out one or more of the functions of server 460.

Each of server 460, account terminal 440 and merchant terminal 420 may also include computer memory, such as, for example, random-access memory (RAM). However, the computer memory of each of the server 460, account terminal 440 and merchant terminal 420 may be any type of computer memory or any other type of electronic storage medium that is located either internally or externally to the respective server 460, account terminal 440 and merchant terminal 420, such as, for example, read-only memory (ROM), compact disc read-only memory (CDROM), electro-optical memory, magneto-optical memory, an erasable programmable read-only memory (EPROM), an electrically-erasable programmable read-only memory (EEPROM), a computer-readable medium, or the like. According to exemplary embodiments, the respective RAM may contain, for example, the operating program for either the server 460, account terminal 440 and merchant terminal 420. As will be appreciated based on the following description, the RAM may, for example, be programmed using conventional techniques known to those having ordinary skill in the art of computer programming. The actual source code or object code for carrying out the steps of, for example, a computer program can be stored in the RAM. Each of the server 460, account terminal 440 and merchant terminal 420 may also include a database. The database can be any type of computer database for storing, maintaining, and allowing access to electronic information stored therein.

As mentioned above, server 460 preferably resides on a network, such as a local area network (LAN), a wide area network (WAN), or the Internet. In one embodiment, the account terminal 440 and merchant terminal 420 preferably are connected to the network on which server 460 resides, thus enabling electronic communications between the server 460, account terminal 440 and merchant terminal 420 over a communications connection, whether locally or remotely, such as, for example, an Ethernet connection, an RS-232 connection, or the like.

In preferred embodiments, merchant terminal 420 is configured to transmit a TAR, which includes account information e.g., as discussed above in relation to step 120 of generating a purchase request. In one embodiment, account terminal 440 is associated with the account held by the account holder, e.g., the account holder has access to the account.

Preferably, account terminal 440 is configured to transmit account information, e.g., provide account information to server 460. As an example, the account information is transmitted via network 480, to server 460. Server 460 may be in communication with both merchant terminal 420 and account terminal 440. In preferred embodiments, server 460 is configured to receive information relating to the first commercial transaction and further configured to compare the transaction information to the account information to determine whether the criteria for pre-authorization are satisfied, as is discussed above in relation to step 140 of comparing the transaction information to the pre-authorization criteria. In a preferred embodiment server 460 is configured to deny the TAR when a determination is made that the pre-authorization criteria are not satisfied, as discussed above in relation to step 160 of denying the TAR. In one embodiment, server 460 is further configured to prevent further determinations regarding the transaction approval request from being made.

Figure 5:
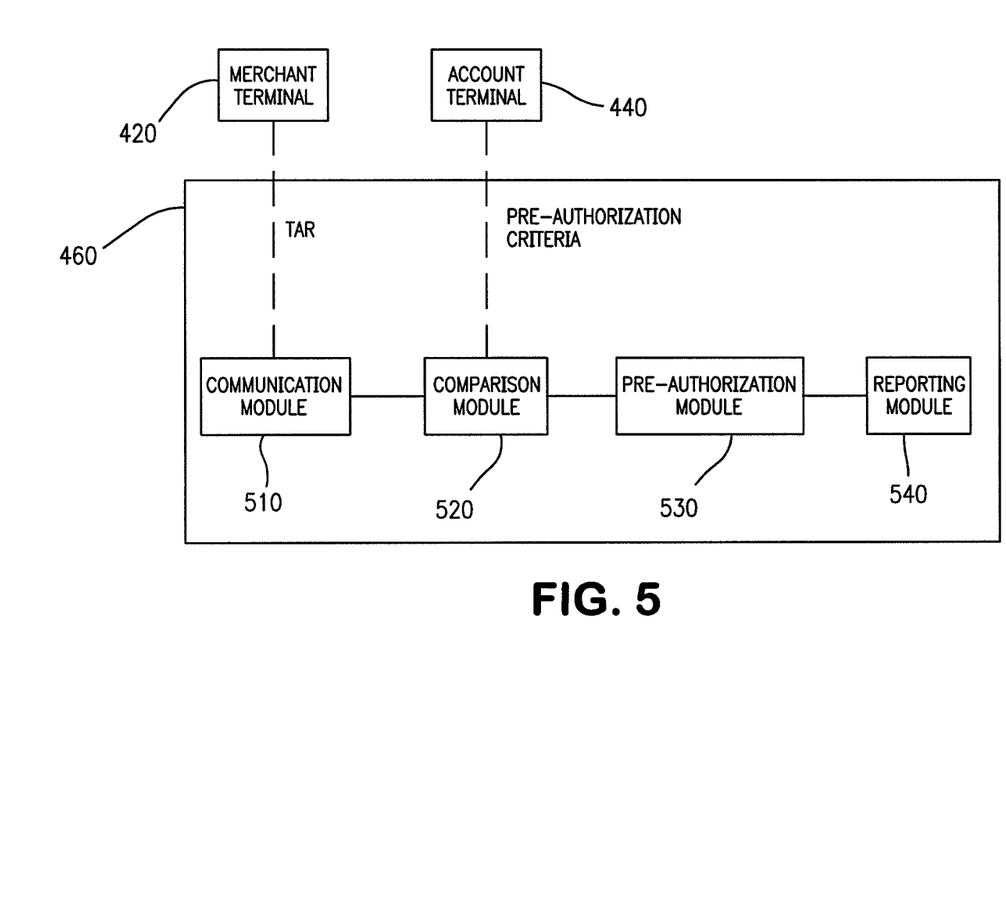
FIG. 5 is a block diagram showing a server in accordance with an embodiment of the present invention.

As shown in FIG. 5, in preferred embodiments, server 460 may comprise a communication module 510, a comparison module 520, a pre-authorization module 530 and, optionally, a reporting module 540. These modules may be implemented in software, hardware, or a combination thereof. In one embodiment, communication module 510 receives the TAR. Accordingly, communication module 510 is in communication with the TAR source, e.g., the merchant. Communication module 510 receives the TAR from the merchant and, optionally, stores the TAR in RAM. In a preferred embodiment, communication module 510 directs the account information to the additional components of the system. Preferably, the TAR that is received by communication module 510 includes information relating to the commercial transaction, as is discussed in detail above. In preferred embodiments, communication module 510 is configured to receive at least one additional transaction approval request, which includes information relating to a second commercial transaction. As such, server 460 is capable of handling multiple TARs either serially or in parallel. Because server 460 has the ability to handle multiple TARs and/or purchase requests, server 460 and, accordingly, system 400 are capable of providing security for multiple transactions which may span extended periods of time.

In one embodiment, in order to receive transaction information, comparison module 520 is in communication with communication module 510. In another embodiment, in order to receive the pre-authorization criteria, comparison module 520 is in communication with the source of the pre-authorization criteria. In preferred embodiments, comparison module 520 compares the transaction information with the pre-authorization criteria and determines whether the pre-authorization criteria are satisfied. Preferably, comparison module 520 communicates the pre-authorization determination to pre-authorization module 530. In addition, in a preferred embodiment, comparison module 520 is configured to compare the transaction information for multiple transactions to the updated account information for the respective transactions.

In one embodiment, in order to make the pre-authorization determination, pre-authorization module 530 is in communication with comparison module 520. Preferably, comparison module 520 provides the comparison information to pre-authorization module 530. In order to deny non-pre-authorized TARs, pre-authorization module considers whether the pre-authorization criteria are satisfied. If the criteria are satisfied, the TAR is granted; if the criteria are not satisfied, the TAR is denied, as discussed above. In addition, in a preferred embodiment, pre-authorization module 530 is configured to grant or deny multiple TARs related to multiple transactions.

In another embodiment, step 140 of comparing and step 160 of denying are performed by one module. In such an embodiment, a separate comparison module and a separate pre-authorization module are not necessary.

Server 460, optionally, is configured to report the denial of the non-pre-approved TAR. In one embodiment, server 460 may comprise reporting module 540 for reporting the denial of the non-pre-approved TAR. In one embodiment, reporting module 540 is in communication with pre-authorization module 530. As such, reporting module 540 receives information relating to the denial or grant of the TAR from the pre-authorization module 530. Upon receipt of this information, reporting module 540 reports the disposition of the TAR, as discussed above.

Embodiments of the invention will become more evident in view of the following non-limiting examples.

EXAMPLE 1

In one scenario, Account Owner has a credit card account. For the credit card account, Account Owner provides the following pre-authorization criteria:
Maximum amount=$1000;
List of merchants=Bloomingdale's, Barnes & Noble and Local Grocery Store;
Locked status=on ("locked").

Account Owner's Son obtains Account Owner's credit card and attempts to make a $50 purchase at Sports Authority.

A credit card protection program (CCPP) in accordance with the present invention is utilized to authorize credit card purchases and the purchase request is forwarded to the CCPP. In such a case, all of the pre-authorization criteria are not satisfied, the purchase request is denied, and the transaction is closed permanently, without the possibility of further verification.

COMPARATIVE EXAMPLE A

The scenario of Example 1 is repeated, however, a CCPP that directs non-pre-authorized purchases to a queue for further verification is utilized. Initially, the purchase request is compared with the pre-authorization criteria, then, because all of the criteria are not satisfied, is sent to the queue for further disposition. While the purchase request is in the queue, Son accesses the credit card account online and updates the pre-authorization criteria to:
Maximum amount=$10;
List of merchants=Bloomingdale's, Barnes & Noble and Sports Authority.

Son returns to Sports Authority. The CCPP verifies the purchase request (which remains in the queue) against the updated criteria and, accordingly, pre-authorizes the purchase request. The purchase proceeds and the credit card is charged for the $50 purchase.

The CCPP utilizing the present invention stops and closes the purchase, permanently, once the initial pre-authorization fails. Even if Son had altered the pre-authorization criteria and returned to Sports Authority as in the Comparative Example, the opportunity for further verification of the purchase request would not have been possible due to the permanent closure of the transaction. In contrast, the CCPP of the Comparative Example was allowed to remain open for an indefinite period of time. While remaining open, the account was susceptible to security breaches.

Any feature described or claimed with respect to any disclosed implementation may be combined in any combination with any one or more other feature(s) described or claimed with respect to any other disclosed implementation or implementations, to the extent that the features are not necessarily technically incompatible, and all such combinations are within the scope of the present invention. Furthermore, the claims appended below set forth some non-limiting combinations of features within the scope of the invention, but also contemplated as being within the scope of the invention are all possible combinations of the subject matter of any two or more of the claims, in any possible combination, provided that the combination is not necessarily technically incompatible.

What is claimed is:

1. A method for one or more server to facilitate a commercial transaction between an account holder and a merchant, the method comprising the steps of:
  the one or more server receiving from the account holder at least one criterion for pre-authorizing the commercial transaction, the at least one criterion comprising at least one of (i) at least one authorized merchant, (ii) an authorized monetary amount range per transaction, (iii) an authorized maximum monetary amount per transaction, and (iv) at least one authorized date per transaction, the at least one pre-authorized criterion comprising satisfaction of acceptance criteria of the commercial transaction before the commercial transaction is communicated to the account holder or a third party, the one or more server storing the received at least one criterion for pre-authorizing the commercial transaction;
  the one or more server receiving a transaction approval request from the merchant, the transaction approval request including information relating to the commercial transaction;
  the one or more server comparing the received transaction approval request to the received at least one pre-authorized criterion to determine whether the at least one criterion for pre-authorizing the transaction is satisfied; and
  when a determination is made that the at least one criterion for pre-authorizing the transaction is not satisfied, the one or more server denies the transaction approval request without deactivating the account holder's account, in the case of denial, the one or more server preventing (i) further communication from the one or more server to the account holder for verification of the denied transaction approval request and (ii) the further storage of the denied transaction approval request on the one or more server; and
  when a determination is made that the at least one criterion for pre-authorizing the transaction is satisfied, the one or more server authorizes the transaction approval request.

2. The method of claim 1, wherein, when the one or more server makes the determination that the at least one criterion for pre-authorizing the transaction is not satisfied, the one or more server prevents further determinations regarding the denied transaction approval request from being made.

3. The method of claim 1, wherein the at least one criterion for pre-authorizing the commercial transaction stored by the one or more server is modifiable by the account holder.

4. The method of claim 1, wherein the one or more server denies all transaction approval requests for which no pre-authorizing criterion has been submitted by the account holder.

5. The method of claim 1, wherein the one or more server receives from the account holder at least three of said criterion for pre-authorizing the commercial transaction.

6. The method of claim 1, wherein the one or more server receives the at least one criterion for pre-authorizing the commercial transaction from the account holder via at least one of (i) an Interactive Voice Response system, and (ii) via a customer service.

7. The method of claim 1, wherein the at least one authorized date per transaction comprises date and time information.

8. The method of claim 1, wherein the at least one criterion for pre-authorizing the commercial transaction received from the account holder further comprises a locked status indicator, the locked status indicator indicating whether the account is available for particular transactions.

9. The method of claim 8, further comprising the step of the one or more server monitoring the account having a locked status.

10. The method of claim 1, further comprising the step of the one or more server receiving at least one additional transaction approval request, the at least one additional transaction approval request including information relating to a second commercial transaction.

11. The method of claim 10, wherein, after the one or more server receives the original commercial transaction approval request but prior to the one or more server receiving the at least one additional transaction approval request, the one or more server receives from the account holder a change of at least one of the stored criterion for pre-authorizing the commercial transaction.

12. The method of claim 11, further comprising the steps of:
  the one or more server comparing the received at least one additional transaction approval request to the at least one changed stored criterion to determine whether the at least one changed stored criterion for pre-authorizing the second commercial transaction is satisfied; and
  when a determination is made that the at least one of the stored criterion for pre-authorizing the second commercial transaction is not satisfied, the one or more server denying the at least one additional transaction approval request.

13. The method of claim 1, further comprising the step of the one or more server reporting to the merchant the denial of the non-pre-authorized transaction approval request.

14. The method of claim 13, further comprising the step of the one or more server notifying the account holder when the transaction approval request is denied.

15. A system for facilitating a first commercial transaction between a merchant and an account holder, comprising:
  one or more servers configured to receive from the account holder at least one criterion for pre-authorizing the commercial transaction, the at least one criterion comprising at least one of (i) at least one authorized merchant, (ii) an authorized monetary amount range per transaction, (iii) an authorized maximum monetary amount per transaction, and (iv) at least one authorized date per transaction, the at least one pre-authorized criterion comprising satisfaction of acceptance criteria of the commercial transaction before the commercial transaction is communicated to the account holder or a third party, the one or more server storing the received at least one criterion for pre-authorizing the commercial transaction;
  the one or more server being also configured to receive from the merchant a transaction approval request, the transaction approval request including information relating to the first commercial transaction;
  the one or more server being further configured to compare the received transaction approval request to the received at least one pre-authorized criterion to determine whether the at least one criterion for pre-authorization is satisfied;
  wherein the one or more server is further configured to deny the transaction approval request when a determination is made that the at least one criterion for pre-authorizing the transaction is not satisfied, without deactivating the account holder's account, in the case of denial, the one or more server preventing (i) further communication from the one or more server to the account holder for verification of the denied transaction approval request and (ii) the further storage of the denied transaction approval request on the one or more server; and wherein the one or more server is further configured to pre-authorize the transaction approval request when a determination is made that the at least one criterion for pre-authorizing the transaction is satisfied.

16. The system of claim 15, wherein, when the one or more server makes the determination that the at least one criterion for pre-authorizing the transaction is not satisfied, the one or more server is further configured to prevent further determinations regarding the transaction approval request from being made.

17. The system of claim 15, wherein the at least one criterion for pre-authorizing the commercial transaction stored by the one or more server is modifiable by the account holder.

18. The system of claim 15, wherein the one or more server denies all transaction approval requests for which no pre-authorizing criterion has been submitted by the account holder.

19. The system of claim 15, wherein the one or more server receives the at least one criterion for pre-authorizing the commercial transaction from the account holder via at least one of (i) an Interactive Voice Response system, and (ii) via a customer service representative.

20. The system of claim 15, wherein the at least one authorized date per transaction comprises date and time information.

21. The system of claim 15, wherein the at least one criterion for pre-authorizing the commercial transaction received from the account holder further comprises a locked status indicator, the locked status indicator indicating whether the account is available for particular transactions.

22. The system of claim 15, wherein the one or more server is further configured to receive at least one additional transaction approval request, the at least one additional transaction approval request including information relating to a second commercial transaction.

23. The system of claim 22, wherein, after the one or more server receives the original commercial transaction approval request but prior to the one or more server receiving the at least one additional transaction approval request, the one or more server receives from the account holder a change of at least one of the stored criterion for pre-authorizing the commercial transaction.

24. The system of claim 23, wherein the one or more server is further configured to compare the received at least one additional transaction approval request to the at least one changed stored criterion to determine whether the at least one changed stored criterion for pre-authorizing the second commercial transaction is satisfied; and, when a determination is made that the at least one of the stored criterion for pre-authorizing the second commercial transaction is not satisfied, the one or more server denies the at least one additional transaction approval request.

25. The system of claim 23, wherein the one or more server is further configured to report the denial of the non-pre-authorized transaction approval request to the merchant.

* * * * *